United States Patent [19]
Horgan et al.

[11] Patent Number: 5,791,758
[45] Date of Patent: Aug. 11, 1998

[54] ILLUMINATED POOL TABLE

[76] Inventors: Randy Horgan, 66 Williams Point Rd., Caesarea, Ontario, Canada, LOB 1EO; Theodore Felde, 37 Ann St., Cannington, Ontario, Canada, LOE 1EO

[21] Appl. No.: 845,006

[22] Filed: Apr. 22, 1997

[51] Int. Cl.⁶ .................................................. F21V 8/00
[52] U.S. Cl. .............................. 362/32; 362/253; 473/4
[58] Field of Search ............................ 362/32, 33, 97, 362/127, 253; 473/4, 30, 31

[56] References Cited

U.S. PATENT DOCUMENTS

| | | | |
|---|---|---|---|
| 3,917,264 | 11/1975 | Davidson et al. | 473/2 |
| 4,029,313 | 6/1977 | Angulo | 273/2 |
| 4,531,732 | 7/1985 | Harris | 273/14 |
| 4,639,838 | 1/1987 | Kato et al. | 362/33 |
| 4,912,605 | 3/1990 | Whitehead | 362/32 |
| 5,122,933 | 6/1992 | Johnson | 362/32 |
| 5,170,517 | 12/1992 | Stegmeier | 4/496 |
| 5,312,393 | 5/1994 | Mastel | 606/4 |
| 5,325,272 | 6/1994 | Miller | 362/32 |
| 5,345,531 | 9/1994 | Keplinger et al. | 385/102 |
| 5,416,669 | 5/1995 | Kato et al. | 362/32 |
| 5,470,765 | 11/1995 | Stiefvater | 473/28 |
| 5,548,492 | 8/1996 | Hansen et al. | 362/83.1 |
| 5,572,818 | 11/1996 | Churchill | 40/547 |

OTHER PUBLICATIONS

Fiber Optic Lighting. Brochure #FOL2, Fiberstars, Inc. 1996.
Fiber Optic Tubing. Bruchure #FT1. Fiberstars, Inc. 1996
Color Change Options 402,403,501" Fiberstars, Inc. 1995.
Fiber Optic Landscape Lighting. Brochure #FS2. Fiberstars, Inc. 1996.
Fiberescent Fiber Optic Downlighting. Brochure. Fiberstars, Inc. 1995.
Fiberstars, Inc. brochure directed to Fiber–Glo, Even–Glo, Accent–Glo and Star–Glo, undated.

*Primary Examiner*—Stephen F. Husar
*Attorney, Agent, or Firm*—Dinsmore & Shohl LLP

[57] ABSTRACT

An illuminated pool table comprises a pool table having a playing surface, a light generator, and a plurality of optical fibers which are arranged to receive light from the generator and illuminate the playing surface. In one embodiment, the optical fibers are arranged in a channel formed between the pool table playing surface and a rail of the pool table.

15 Claims, 5 Drawing Sheets

ILLUMINATED POOL TABLE

FIELD OF THE INVENTION

This invention pertains generally to an illumination means for billiard and pool tables and more specifically, is directed to illuminated billiard and pool tables wherein illumination is provided from the perimeter of their playing surfaces.

BACKGROUND OF THE INVENTION

Typical pool halls use overhanging light fixtures to illuminate the playing surfaces of billiard or pool tables.

In years past, a single incandescent light bulb would hang suspended from a ceiling overhead, with some sort of simple lamp shade focussing light toward the playing surface. In the course of a game of pool, the player would drape his or her body over a section of the playing surface and the single overhead point source of light would be blocked, such that the player's body would cast a shadow over a critical field of play.

In China, often planners need to take into account the ceiling height for prospective pool halls when determining the suitability of said halls for the intended usage. Apparantly, low ceilings are common in Chinese establishments.

The standard height of hanging light fixtures over pool tables is to position the fixture such that the light bulb is about 32 to 36 inches over the playing surface of the pool table; depending on the intensity of the light, the fixture may be raised or lowered at the time of installation. Often, tall players will smash their heads against the hanging overhead light fixture. Sometimes a light bulb is broken as a result of the impact, causing shards of glass to hit the playing surface, damaging the surface. The playing surface will then have to be replaced at a significant cost and there will be a day or two, at best, of downtime on the pool table.

Occassionally, a pool hall owner will wish to reconfigure the layout of the pool tables. This is often a very expensive and time consuming task, as the light fixtures also need to be moved, to be centered over the playing surfaces. To date, this has been a continuing and on going problem.

Angulo (U.S. Pat. No. 4,029,313) teaches a pool table lamp shade or canopy which holds and stores the accessories necessary to play the game of pool and additionally claims to provide proper light distribution to the pool table. The canopy is attached to a standard 48 inch, 2 lamp, fluorescent light fixture hung above the pool table, and envelopes said fixture, again claiming to provide proper light distribution.

The cost of moving this fixture is definitely expensive, involving technicians for drilling and repositioning, and an electrician to move the electrical outlet.

The aesthetic appearance of the fixtures is also undesirable. The overhead lights and canopies tend to collect dust and block television monitors found in many pool hall establishments.

Steifvater (U.S. Pat. No. 5,470,765) teaches a pool table having a gravity fed ball return system with a ball return compartment positioned beneath the playing surface thereof, combined with a self-powered electrical light bulb. This invention however does not solve the problem of illuminating the playing surface. It only illuminates the ball return compartment.

Accordingly, a need exists for improved pool and billiard table lighting systems.

SUMMARY OF THE INVENTION

An object of the present invention is to provide a system and apparatus which overcome disadvantages of the prior art. It is a related object to provide billiard and pool table illumination systems which eliminate shadows on the playing surfaces of the tables.

In a broad embodiment, the invention relates to an apparatus comprising a translucent optical fiber filament and a light generator for use in conjunction with a billiard or pool table. The filament projects light on to and illuminates the playing surface and eliminates shadows on the playing surface of the billiard or pool table.

In a more specific embodiment, the invention relates to a lighting system for use in billiard or pool tables, which comprises:

a translucent light transmitting optical fiber;

a billiard or pool table, hereinafter called a pool table, which includes a playing surface and a rail;

a channel sized to house said optical fiber light guide between said playing surface and said rail, provided in or upon said pool table; and a light source which is fixedly positioned within said pool table housing and to which the at least one optical fiber cable is optically coupled. Preferably, the channel which contains the optical fiber cable extends and runs at least a portion of the length of the table for directing illumination laterally therefrom, to the field of play.

The present invention is advantageous in that shadows on the playing surface are eliminated and rearrangement of the tables is facilitated.

Additional objects and advantages of the invention will be apparent from the detailed description.

BRIEF DESCRIPTION OF DRAWINGS

The invention will be more fully understood in view of the drawing, in which.

DETAILED DESCRIPTION

The present invention relates to a system for lighting the playing surface of a pool table. Within the present specification, the term pool tables is used to generically refer to pool tables, "billiard tables", "regulation tables", "snooker tables" and "eight ball tables", among others. Basically, in one embodiment, a light is provided along at least a portion of the perimeter of the playing surface, for example under the rail of the pool table. In one embodiment, the light is derived from a translucent fiber-optic cable and has no visible point sources of radiating light or bright spots. The fiber-optic cable receives light from a light generator. The light generator may be any of those conventional in the art, such as the 007 series light generator manufactured by Fiberstars, Inc. In fact, the light will illuminate the playing surface with a back light effect, radiating laterally from the perimeter of the playing surface with an even and continuous glow, eliminating shadows.

Figure 1:
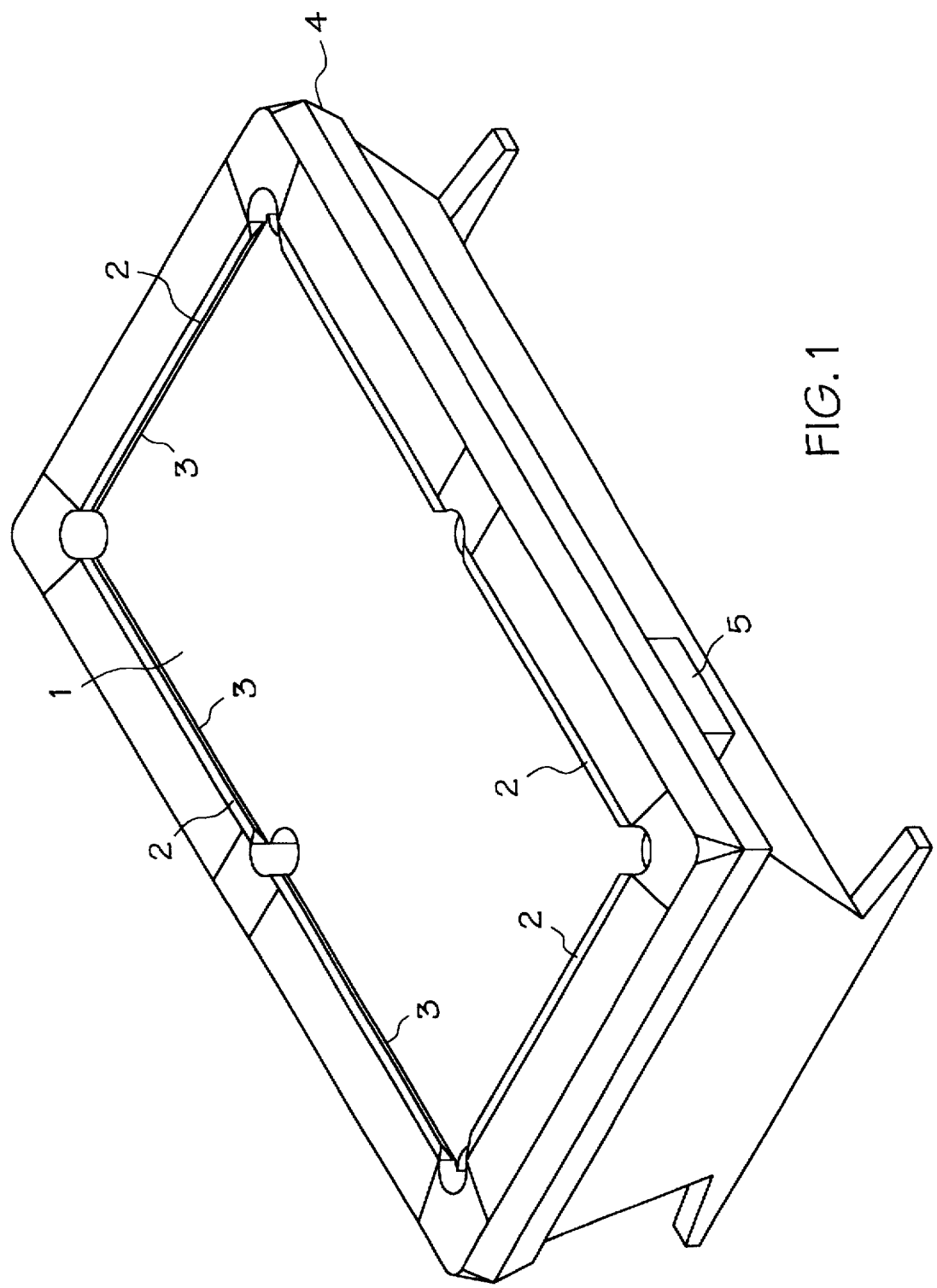
FIG. 1 is a perspective view of one embodiment of a pool table, according to the invention.
Figure 2:
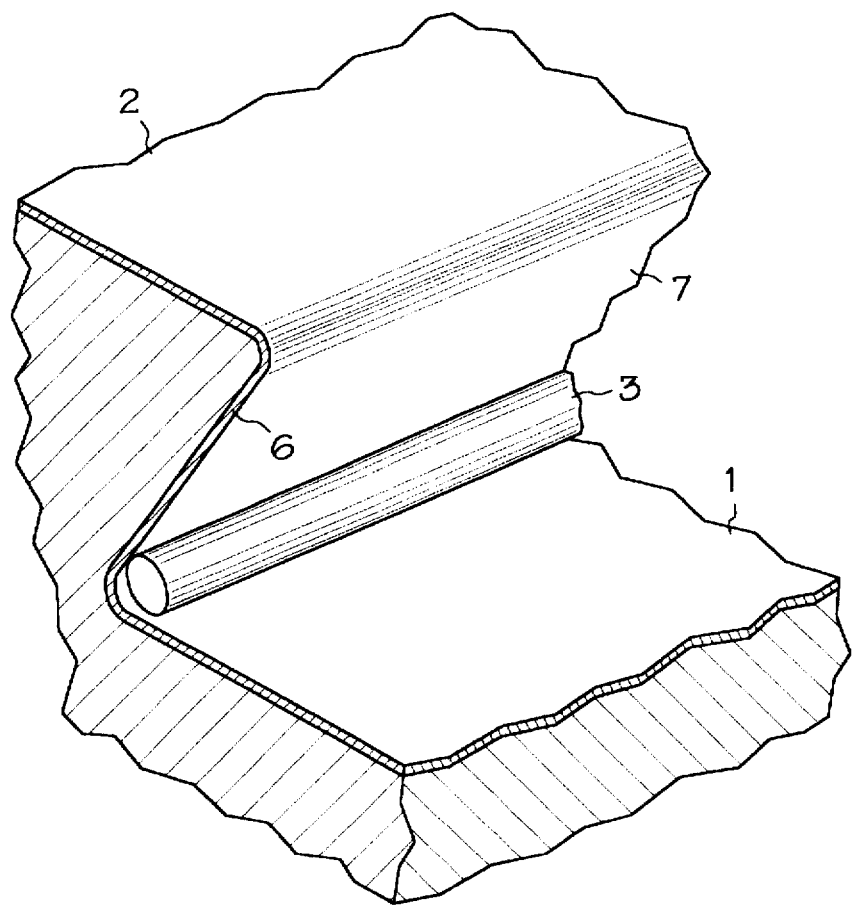
FIG. 2 is a perspective view of a cross-section of the playing surface and the rail of one embodiment of a pool table according to the invention.
Figure 3:
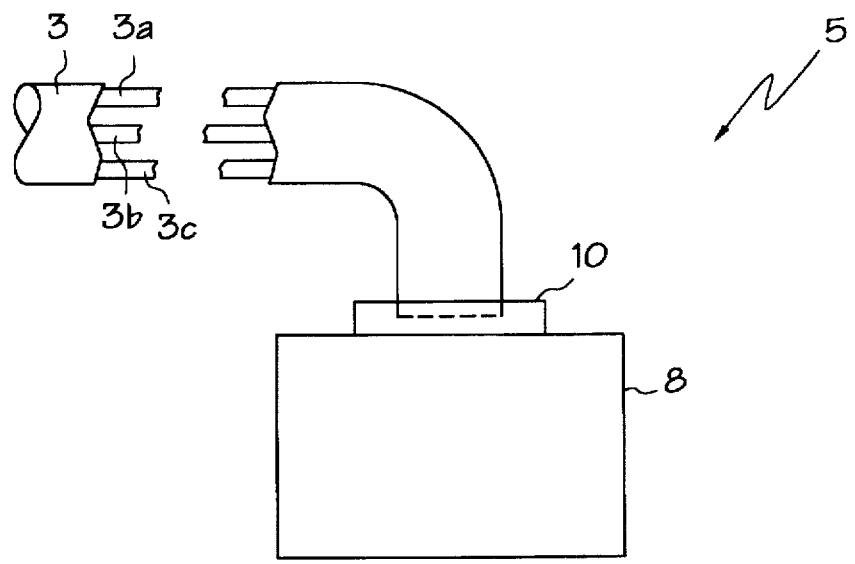
FIG. 3 is a diagram of a light source and optical fibers arranged to receive light flux at at least one end thereof for use in an embodiment of the invention.

With reference to FIG. 1, a pool table 4 includes a playing surface 1 and rails 2 along the perimeter of the playing surface. As shown in FIG. 2, light emitting optical fibers 3 are installed into a crevice or channel 6 formed between the inward sloping surface 7 of the rails 2 and the playing surface 1. The optical fibers 3 (3a, 3b, 3c) are optically connected at 5 to a light source generator 8 by an interface 10 to receive light flux, as shown in FIG. 3.

In one embodiment, the optical fibers 3 extend continuously around the perimeter of the playing surface 1, i.e., the illumination is continuous and not interrupted along the perimeter.

In another embodiment, the optical fibers are arranged in a discontinuous manner around the perimeter of the playing surface, i.e. the illumination is interrupted along the perimeter. For example, light may be blocked by an opaque covering where the cable traverses the pockets which bisect the length of the table and are found at each of the table's four corners.

The invention yields aesthetic visual effects. It offers no objects with which to interfere with the players or the view of bystanders. No one will bump their head upon this light source. There will be no consideration for the height of the ceiling, when selecting sites for pool tables. Tables may be rearranged in pool halls without consideration for the overhead lighting. The lighting system overall is very energy efficient and produces no noticable heat along the length of the optical fibers. The light generator may produce and vary the color output with a simple adjustment or programming, in a manner described herein.

In the preferred embodiment, the rail along the perimeter effectively protects the optical fibers from damage. The optical fibers are easily installed in new or used tables. The optical fibers may be secured in place by being pressure fit in the crevice or channel 6 or may be secured by means of a "U" hook, an adhesive or the like.

Figure 4:
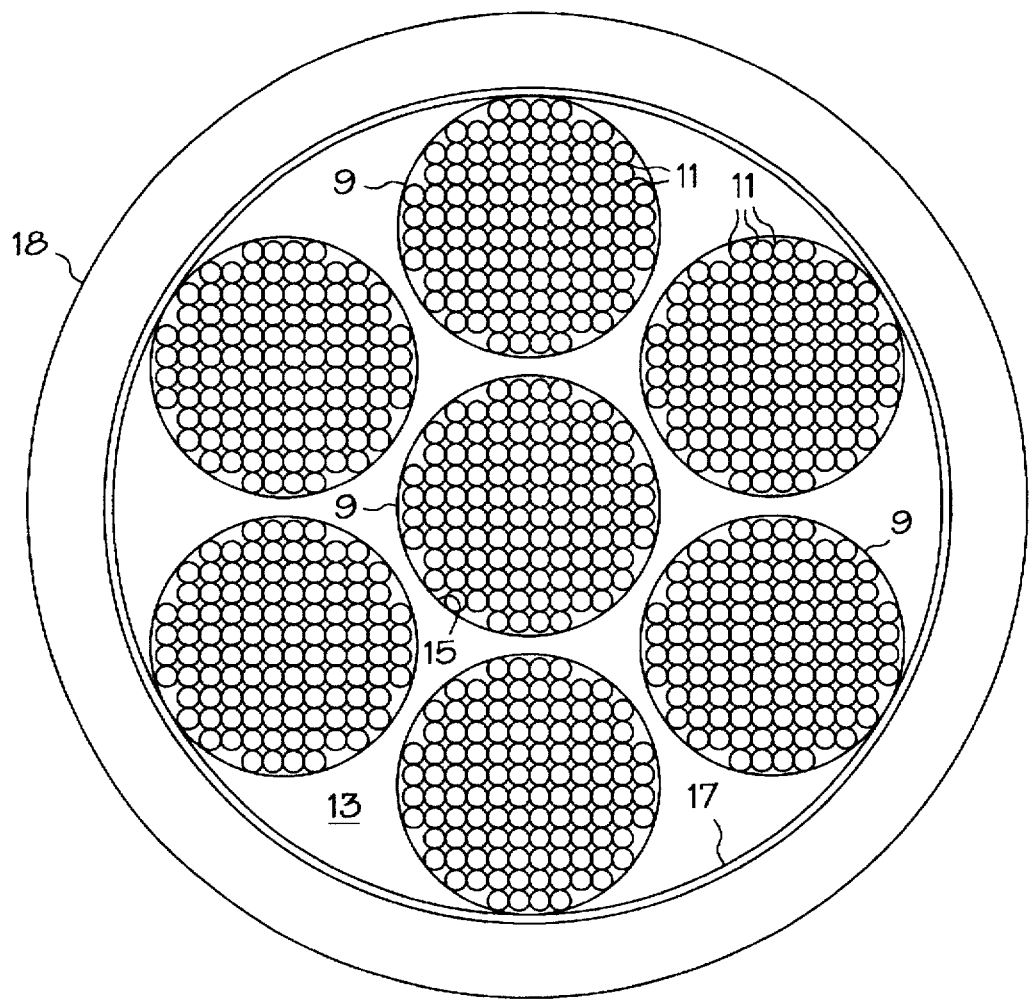
FIG. 4 is a cross-sectional view of a composite cable of optical fiber in accordance with one embodiment of the present invention.
Figure 5:
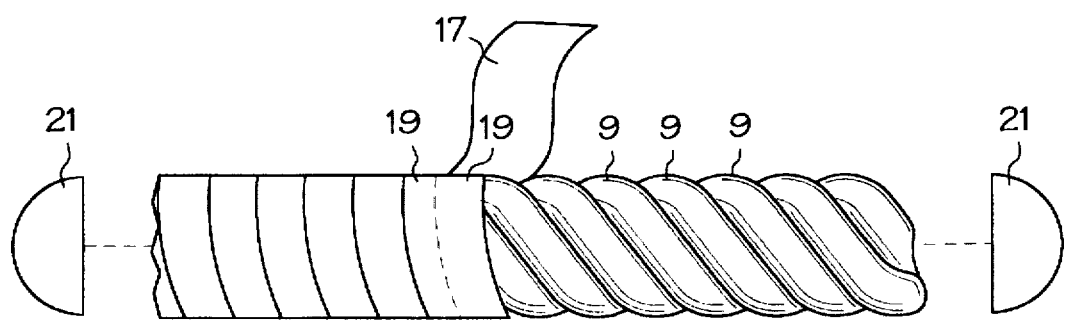
FIG. 5 is a pictorial view of the partial composite cable of FIG. 4 in an optical cable lighting system.

Refering now to the cross-sectional view of FIG. 4, and the schematic view of FIG. 5, there is shown an optical cable prepared in accordance with one embodiment of the present invention. In this embodiment, each of the single cables 9 are formed of a plurality of two or more individual optical fibers 11 that are formed in conventional manner including a core of a plastic material such as polymethylmethacrylate (PMMA) having an associated index of refraction, with a diameter of about 0.010 to 0.080 inches (typically, 0.030 inches); and including an outer cladding layer of plastic material having a different index of refraction. The fibers 11 are all twisted or woven or otherwise convoluted together in a continuous manner over the length of the cable. In another embodiment, a plurality of individual optical fibers 11, for example about 14 fibers, a single cable 9, about wherein four of such fibers form a generally straight, central core of the cable with the remaining individual fibers being continuously wrapped around the central core of fibers. Fiber optic cables formed in these ways promote perceived improvement in the lateral emission of light flux from the surface of individual fibers, with total light flux including the light flux that is laterally emitted from the central or core fibers through the surrounding outer or surface-oriented fibers, appearing to be more uniformly distributed over the length of the cable when illuminated from both ends. In typical applications, the twist of all such individual fibers (or of the outer fibers over a central core of fibers) may be arranged in one rotational orientation, for example, clockwise lay, with about 3½" to 7½" pitch (i.e., the distance along the cable over which a fiber exhibits one complete wrap), and with negligible tension in individual fibers as they are twisted together.

A plurality of two or more, and typically of about 7 to 12 of such individual cables 9 are then wrapped or twisted together in opposite or counter-clockwise rotational orientation (or the same rotational orientation) with about 4½" to 10" pitch to form a composite cable 13 of optical fibers with negligible tension in single cables 9 and in individual fibers 11 as the fibers and the single cables are twisted or wound together. Thus, individual optical fibers 11 in each of the single cables 9 may be oriented near the surface over some portion of one or more pitches. Alternatively, a single cable 15 may be oriented as a straight, central core cable with the remaining single cables 9 twisted around the core cable 15 to remain adjacent the surface of the composite cable 13 over its entire length.

The composite cable 13 may then be wrapped with a layer of clear or colored, transparent tape 17 or other sheath covering that is formed to about 0.001 inch thickness of a polymer material such as "TEDLAR" or "MYLAR", commercially available from DuPont or the like, which can provide heat insulation and, optionally, Ultraviolet-ray inhibition. The sheath covering 17, when formed of a web or strip or tape, may be oriented with about 30 to 40 percent of its width overlapping as shown at 19 in each wrap or lay of the tape 17 about the composite cable 13. Alternatively, a sheath of such material may be formed by extrusion or other suitable means to provide heat insulation and, optionally, ultraviolet-ray inhibition. Then, a protective sheath 18 of clear flexible plastic material such as polyvinyl chloride may be co-extruded over the composite cable 13 in conventional manner to enshroud the composite cable 13 in an outer jacket 18 and thereby provide moisture and abrasion protection for the individual fibers that form the composite cable 13. Additionally, ultraviolet-ray inhibitors and biological inhibitors against bacterial and fungal activity may be incorporated into the composition of the clear, flexible material of the outer jacket 18, and colorants or dyes may also be incorporated into the material of the outer jacket 18 to provide desired aesthetic lighting effects.

It is believed that such twisting or weaving or other similar assembling of individual fibers 11 within a single cable 9 and within the composite cable 13 provides sufficiently slight bends in each optical fiber along its length to enhance the lateral emission of light flux from the individual fibers at such bends substantially uniformly over the length of the fiber. Accordingly, such single cables 9, or composite cables 13, with light sources 21 coupled to the ends thereof exhibit improved perceived uniformity of lateral light emission with distance therealong from the end adjacent a light source toward the center of the cable that is most remote from a light source. Additionally, it is believed that the introduction of an insulating sheath 17 between the assembled cable and the outer jacket 18 reduces the deterioration of optical properties of the optic fiber material attributable to heat associated with conventional co-extrusion processes used to form the outer jacket 18 over the assembled cable. In one embodiment, the sheath 17 thus promotes perceived uniformity of laterally emitted light from the assembled cable over lengths to about 200 feet.

In another embodiment of a cable preferred for use in present invention, the strip or tape 17 may be opaque, reflective material such as aluminum foil or may be translucent or colored transparent material that is wrapped around a single cable 9 or around an entire composite cable in non-overlapping relationship to provide a portion of the surface of a single cable 9 (or of the composite cable 13) that is exposed to permit lateral emission of light from the cable in a continuous, spiraling stripe.

Figure 6A:
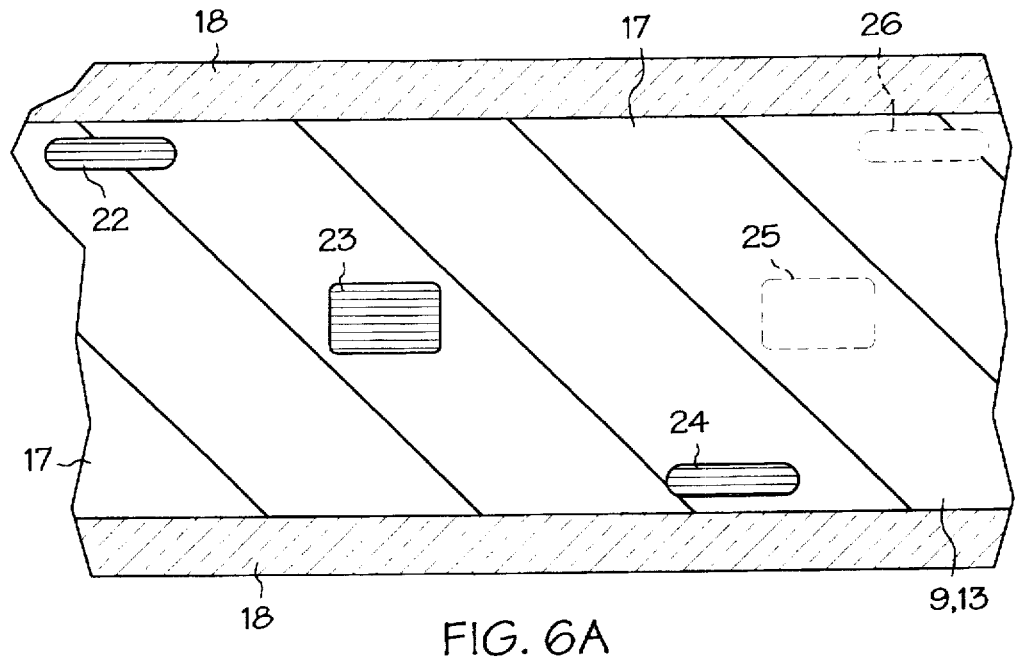
FIGS. 6(A) and 6(B) are partial schematic views of cables of optical fibers in accordance with additional embodiments of the present invention arranged to provide apertures at selected locations along the assembled cable.
Figure 6B:
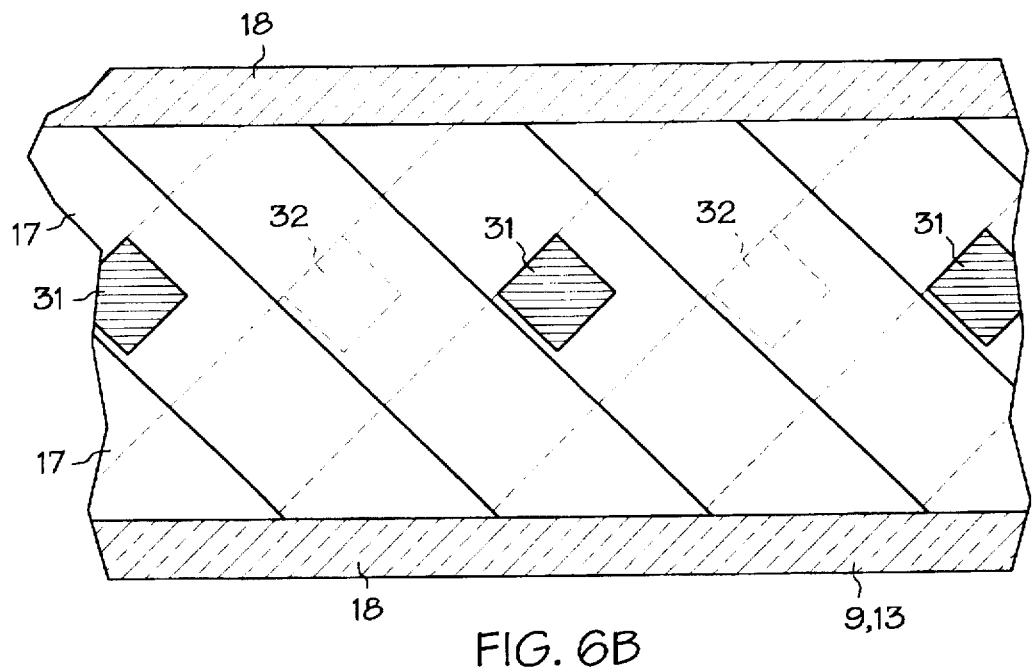

In still another embodiment of the cable used in the present invention as illustrated in FIG. 6(a), the sheath 17 may be formed about a single cable 9 (or about the composite cable 13) to include apertures 22, 23, 24 (on the front side), 25, 26 (on the rear side) in numerous shapes and spacings about the surface of the cable 9, 13. Alternatively, as illustrated in FIG. 6(b), at least two such strips or tapes may be wound around a single cable, or around the composite cable, in non-overlapping relationship and in opposite directions to form a sheath that exposes a stripe of cable surface that is then intersected by another strip or tape wound in the opposite direction to expose only apertures of surface 31 (on the front side) and 32 (on the rear side) at selected intervals along a cable through which light may be emitted, thereby to provide the appearance of discrete light sources located at selected intervals along the length of the cable. Of course, a sheath 17 of such materials may also be disposed about each single cable 9 (or about the composite cable 13), and include apertures therein of selected shape and at selected intervals and locations along the cable to provide similar appearance of discrete light sources.

Figure 7:
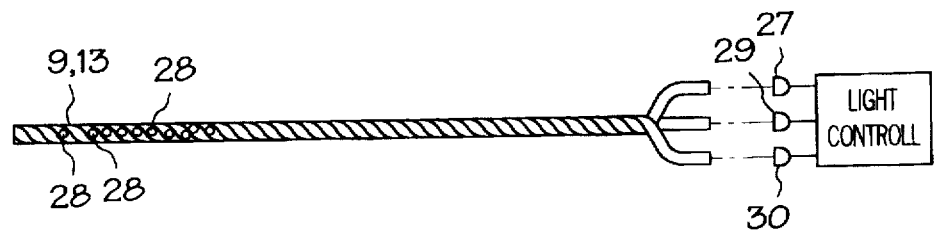
FIG. 7 is a schematic view of an optical fiber lighting system according to one embodiment for forming the illusion of moving light sources along the length of the cable.

In another embodiment of the present invention, as illustrated in FIG. 7, two or more single cables are each formed with opaque (or translucent or colored transparent) sheaths thereon having apertures 28 positioned at selected intervals of, for example about 1 inch, along the length of the sheath with the apertures being formed at substantially the same selected spacing on each cable, but displaced an increment of length from the positions of the apertures on other cables. Thus, the apertures on each cable are displaced incrementally from the apertures on other cables. Light sources 27, 29, 30 are positioned at least on one of the ends of each individual cable and are each sequentially activated (or, are activated in end-end pairs) in one embodiment for pulsed operation in recurring manner to produce the appearance of light sources 'moving' along the length of the cable. In one embodiment with at least 3 cables 9 and associated light source, or end-end paired light sources, the direction of the apparent movement is determined by the order or sequence in which the associated light sources are recurringly activated. The single cables need not be twisted together, but may be retained in adjacent orientation over their length by an outer sheath or jacket of transparent material that retains the single cables in relative positions, and that may also enshroud the cable and include ultraviolet-ray inhibitors to provide protection against environmental elements.

Figure 8:
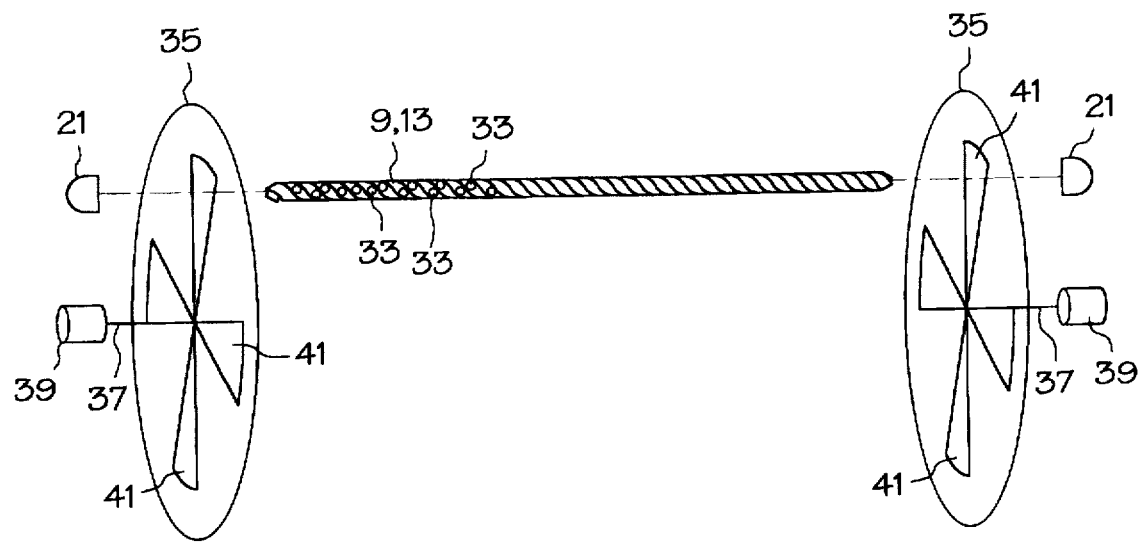
FIG. 8 is a schematic view of an optical fiber lighting system according to another embodiment for forming the illusion of moving light sources along the length of the cable.

Referring now to the schematic diagram of FIG. 8, another embodiment of the illumination source is illustrated in which an assembled composite cable 9, 13 includes two or more single cables that are twisted together and are covered by a sheath that is extruded or wrapped about the composite cable in a manner as previously described to provide apertures 33 of selected spacings and shapes (e.g. arrows or pointers) along at least a portion of the length of the cable. A shutter wheel 35 that is mounted to rotate about the axis of a shaft 37 of a drive motor 39 is disposed in the path of light flux from light source 21 to the end of the cable in order to interrupt the illumination of the cable from the light source 21. Specifically, apertures 41 in the shutter wheel 35 may be separated by a frame of opaque material having a radial extent that may be at least as long as the diameter of the cable 13. Thus, as the wheel 35 rotates, the transition in illuminating flux "sweeps" over the sectional area of the end of the cable. And, as illustrated in the sectional view of FIG. 4, the fibers that are assembled into single cables 9 are confined to specific segments of the total cross sectional area of the cable. Thus, as an aperture 41 in the wheel transmits light flux to the end of the composite cable 13, only a single cable (or cables) in the initially-illuminated segment of the cable end are illuminated, and that single cable (or cables) is illuminated along the length of the composite cable, but dominantly visible only in the convolutes of twist that appear near the lateral surface of the cable 13 being viewed. Therefore, the same single cable appears illuminated over short lengths that are spaced along the entire length of the composite cable 13. As other single cables 9 that are confined to segments of the sectional area of the composite cable 13 are illuminated through an aperture 41 of the wheel as it rotates across the sectional are of the end of the composite cable, other single cables in spaced locations within the cable end also are illuminated over the entire length of the cable, but the light flux laterally emitted therefrom appears at the surface being viewed to be in short lengths that are spaced apart along the length of the composite cable 13. Thus, as separate single cables 9 are sequentially illuminated, separate spatially-oriented twists of those single cables emit light that is perceived from one viewing surface to 'move' along the composite cable 13. Of course, light sources 21 may be positioned to illuminate both ends of composite cable 13, and a shutter wheel 35 and associated drive motor 39 may be disposed at each end of the cable for synchronized operation to enhance uniformity of illumination from the cable 13 over the entire length thereof. Also, both ends of the cable 13 may be oriented to be illuminated by the same one light source through one shutter wheel 35. Shutter wheel 35 may include multiple different color filters in the apertures 41 to provide aesthetically-pleasing visual sensations of different color lights spaced apart and 'moving' along the length of cable 13.

Therefore, the illumination source used in the present invention provides enhanced uniformity of lateral emission of light flux over the length of the cable, and also provides enhanced special effects attributable to spatial and time-oriented synchronized illumination of selected segments of the optical fiber cable.

The specific embodiments and examples set forth above are provided to illustrate the invention and are not intended as limiting. Additional embodiments within the scope of the claims will be apparent to those skilled in the art.

We claim:

1. An illuminated pool table, comprising:
   a pool table including a playing surface;
   a light generator;
   a plurality of translucent light transmitting optical fibers, the optical fibers being arranged to receive light from the light generator and to illuminate the playing surface.

2. An illuminated pool table as in claim 1, wherein the optical fibers are arranged at the perimeter of the pool table playing surface.

3. An illuminated pool table as in claim 1, wherein each of the optical fibers includes a core material that is transparent to radiation in a selected waveband and a layer of cladding material surrounding the core.

4. An illuminated pool table as in claim 3, wherein the optical fibers are substantially spirally wound in contiguous relationship along their length to form a cable and are arranged to receive light flux at at least one end of the cable and to laterally emit light flux substantially along their length from at least one end;

and further wherein the illuminated pool table further comprises a sheath of light-transmissive material disposed about the cable to retain the optical fibers in the contiguous relationship; and an outer layer of light-transmissive material enclosing the cable and sheath over their lengths.

5. An illuminated pool table as in claim 2, wherein the optical fibers extend continuously around the perimeter of the pool table surface.

6. An illuminated pool table as in claim 2, wherein the optical fibers are arranged in a discontinuous manner around the perimeter of the pool table playing surface.

7. A lighted pool table, which comprises:

a plurality of translucent light transmitting optical fibers;

a pool table which includes a playing surface and a rail;

a channel sized to house the optical fibers between the playing surface and the rail and in or upon the pool table to illuminate the playing surface; and a light source which is fixedly positioned within the pool table and to which at least one optical fiber is optically coupled.

8. A pool table as in claim 7, wherein the optical fibers extend to and run the length of the channel for directing illumination radially therefrom to the playing surface.

9. A pool table as in claim 7, wherein each of the optical fibers includes a core material that is transparent to radiation in a selected waveband and a layer of cladding material surrounding the core.

10. A pool table as in claim 9, wherein said optical fibers are substantially spirally wound in contiguous relationship along their length to form a cable and are arranged to receive light flux at at least one end of the cable and to laterally emit light flux substantially along their length from at least one end;

and further wherein the illuminated pool table further comprises a sheath of light-transmissive material disposed about the cable to retain the optical fibers in the contiguous relationship; and an outer layer of light-transmissive material disposed to enclose the cable and sheath over their lengths.

11. A pool table as in claim 10, wherein the sheath includes a substantially continuous layer of light-transmissive material disposed about the cable.

12. A pool table as in claim 10, wherein the core and cladding materials of the optical are plastic; and the sheath provides thermal insulation between the optical fibers and the outer layer.

13. A pool table as in claim 7, wherein the channel is arranged at the perimeter of the pool table playing surface.

14. A pool table as in claim 13, wherein the channel extends continuously around the perimeter of the pool table surface.

15. A pool table as in claim 13, wherein the channel is arranged in a discontinuous manner around the perimeter of the pool table playing surface.

* * * * *